Dec. 8, 1936.  W. NOBLE  2,063,882
HYDRAULIC ACTUATING MEANS
Original Filed May 4, 1927   2 Sheets-Sheet 2

Inventor
Warren Noble

Attorney

Patented Dec. 8, 1936

2,063,882

UNITED STATES PATENT OFFICE 2,063,882

HYDRAULIC ACTUATING MEANS

Warren Noble, Michigan City, Ind., assignor to General Motors Corporation, Detroit, Mich., a corporation of Delaware Refiled for abandoned application Serial No. 188,855, May 4, 1927. This application March 13, 1935, Serial No. 10,894

15 Claims. (Cl. 123—90)

This invention relates to hydraulic valve actuating means, such as valve gears of the type described in patent to Warren Noble and Leon V. Pittman, No. 1,691,896 of November 13, 1928, and is refiled for the abandoned application Serial No. 188,855, filed May 4, 1927, wherein a puppet valve is described as operated by a plunger through the medium of an oil column trapped in an actuator chamber, and valvular means are provided for controlling the inlet of oil to said chamber and the relief of air and oil from the chamber during periods when the puppet valve is closed, said valvular inlet and relief means being illustrated in the form of automatic valves controlled by pressure in the said actuator chamber.

The said valve gear admits of the use of mechanically operated relief or inlet valves for the actuator chamber, or both of the said valves may be mechanically operated; and has also for its object to provide for the mechanical control of flow through the actuator chamber.

Still further the said invention has for its object to provide for the effecting of such mechanical control flow through the chamber by the camshaft or mechanism operating the actuator plunger or plungers as the case may be.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a hydraulic valve gear wherein a puppet valve has its stem exposed to the interior of a hydraulic fluid-confining actuator chamber in which hydraulic fluid is subjected to the action of a cam-operated plunger which effects, through the fluid in said casing, the actuation of said puppet valve; together with a check valve opening from a hydraulic fluid manifold to said actuator chamber, and a relief valve opening from said actuator chamber under the influence of the cam by which said plunger is operated, but at a time when the plunger is dwelling on the base circle of the said cam, whereby, in such open position of the relief valve, flow from the said manifold through the actuator chamber is permitted. All of which is more particularly described and ascertained hereinafter, by way of example, having reference to the accompanying drawings, wherein:

Similar characters of reference indicate similar parts in the several figures of the drawings.

Figures 1, 2, 3:
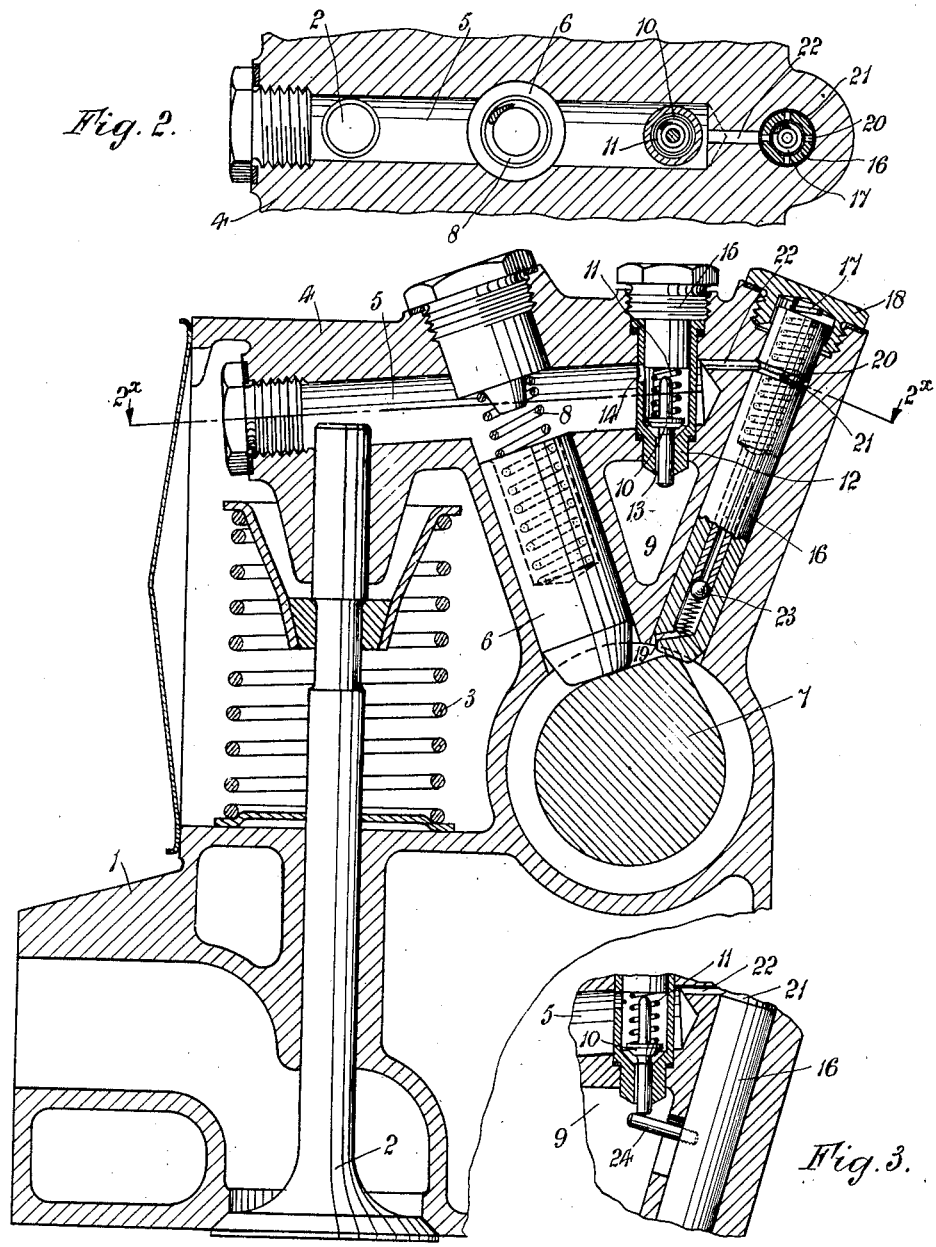
Figure 1 is a transverse section of part of an engine cylinder head structure having incorporated therein valve actuating means embodying the said invention.
Figure 2 is a fragmentary section taken on the line 2×—2× of Figure 1.
Figure 3 is a fragmentary detail section taken on the same plane as Figure 1, illustrating a modified arangement of actuator chamber inlet valve.

Referring first to Figures 1 and 2, cylinder head structure 1 is shown having a puppet valve 2 mounted therein and maintained seated by the valve spring 3, the said cylinder head structure including an upper valve actuator structure 4 chambered to provide a valve actuator chamber 5 to the interior of which the upper end of the stem of the puppet valve 2 is exposed. This chamber is intended to contain a hydraulic fluid, such as oil, which acts as a means of transmitting motion to the stem of the valve 2 from an actuator plunger 6, one end of which plunger is also exposed to the interior of said actuator chamber 5 and the other end is pressed against a cam 7 by a plunger spring 8 so that the said plunger will follow the contour of the said cam.

9 is a fluid manifold preferably supplied with oil under pressure, and 10 is a check valve adapted to open from the said manifold into the actuator chamber 5 when pressure in the manifold 9 exceeds pressure in the actuator chamber to an extent sufficient to overcome the resistance of the check valve spring 11. The check valve is indicated as being housed in a casing 12 having a port 13 communicating with the manifold, and a further port 14 communicating with the actuator chamber to permit the required flow from the manifold to the actuator chamber when the check valve is open. This casing is held in position on suitably provided seats by the plug 15 in the top of the actuator structure.

The actuator structure 4 is also shown as housing a further plunger 16 which forms a relief valve as will be explained, this plunger having its lower end also bearing on the cam 7, by reason of the action of the relief valve spring 17 confined between the said plunger and a plug 18 in the upper end of the said actuator structure 4, the said plunger 16 being so arranged radially of the cam that its operation alternates with that of the plunger 6.

The plunger 16 is tubular and has an outlet passage 19 at its lower end and an inlet passage 20 towards its upper end, which inlet passage opens from an annular groove 21 in the said plunger 16 adapted to register with a relief port 22 of the actuator chamber 5 when the said plunger 16 is raised to a sufficient extent by the lobe of the cam 7. This relief port 22 opens from a high point or region of air accumulation in the actuator chamber 5.

Arranged within the tubular plunger 16 is a spring pressed check valve 23 permitting outward or downward flow only through the said plunger.

As previously explained, rotation of the cam 7 effects intermittent lifting of the plunger 6 and the consequent operation of the puppet valve 2, and during such time as the valve 2 is open, and the plunger 6 in a position other than dwelling on the base circle of the cam, fluid in the actuator chamber 5 is subjected to considerable pressure so that there is no tendency of the check valve 10 to open. During this pressure period the plunger 16 dwells on the base circle of the cam so that the annular groove 21 thereof and the relief port 22 of the actuator chamber do not register, the hydraulic fluid, therefore, being effectively confined in the actuator chamber.

After the lobe of the cam passes beyond the actuator plunger 6 in whichever direction the said cam may rotate, it eventually raises the plunger 16 until the annular groove 21 thereof coincides with the relief port 22 of the actuator chamber, but at this time it will be understood the plunger 6 again dwells on the base circle of the cam, and the puppet valve is closed so that there is then no pressure exerted on the fluid in the actuator chamber. As a consequence, slight pressure of fluid in the manifold 9 will lift the check valve 10 and result in flow taking place through the actuator chamber and therefrom by way of the relief port 22 through the hollow interior of the plunger 16 and the outlet passage 19. The check valve 23 offers but little resistance to this flow which is easily overcome.

The said flow of oil through the actuator chamber during the period of puppet valve inaction is effective both to scavenge air from the said chamber and to ensure a replenishing of oil therein to compensate for any loss by leakage or otherwise, whereby a complete filling of the chamber with oil prior to the ensuing valve actuating movement of the plunger 6 is ensured as required to ensure proper translation of plunger movement into puppet valve movement.

If thought necessary or desirable, means may be provided for the positive operation of the inlet check valve 10, such as to overcome sticking, and in Figure 3 the plunger 16 is shown as being equipped with a projecting member 24 adapted to engage the stem of the said check valve 10 when the said plunger 16 is raised by its cam, thereby positively opening the said check valve.

Figure 4:
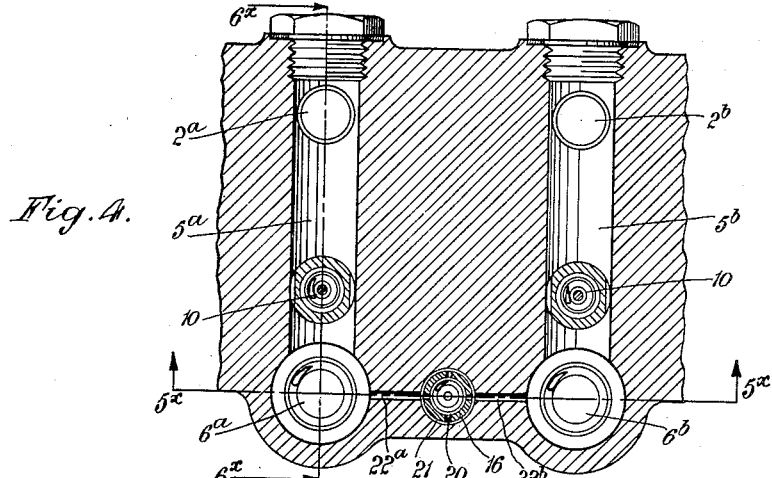
Figure 4 is a fragmentary section taken on the line 4×—4× of Figure 5 through the inlet and exhaust valve actuator chambers of an engine showing a modified arrangement of flow control in which the relief valve is common to both actuator chambers.
Figure 5:
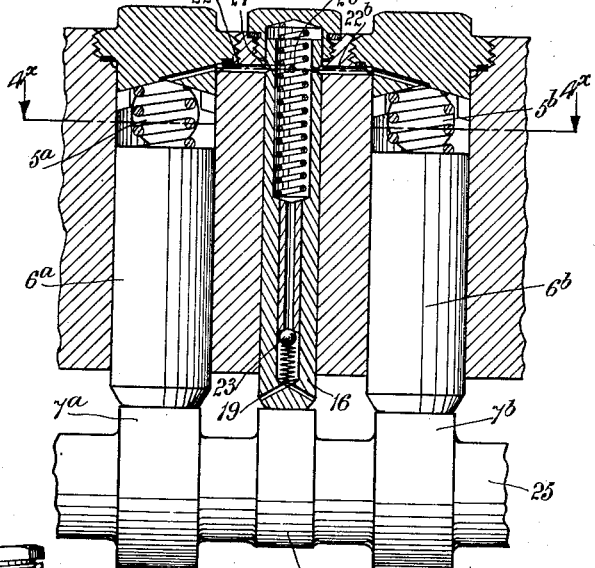
Figure 5 is a vertical section of the same taken on the line 5×—5× of Figure 4.
Figure 6:
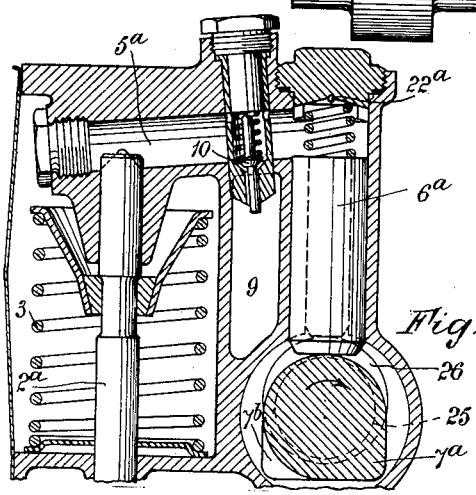
Figure 6 is a transverse section taken on the line 6×—6× of Figure 4.

The relief valve or plunger 16 may not necessarily be limited to the control of flow through a single actuator chamber as in the case of the arrangement shown in the Figures 1, 2 and 3, but may be used in connection with more than one actuator chamber as shown in Figures 4, 5 and 6, wherein 5ª and 5ᵇ represent respectively the actuator chambers of the inlet and exhaust valves 2ª and 2ᵇ of an engine cylinder, wherein the exhaust valve operates immediately prior to the operation of the inlet valve and a relatively considerable period of time elapses between the closing of the inlet valve and the opening of the exhaust valve. During such period both valves are inactive and flow through both of the actuator chambers may simultaneously take place. Taking advantage of this fact, only one plunger 16 is utilized for both actuator chambers, this plunger 16 being situated between the actuator plungers 6ª and 6ᵇ which are operated by the inlet and exhaust cams 7ª and 7ᵇ of the camshaft 25. The relief plunger 16 is operated by a cam 26 intermediate of the cams 7ª and 7ᵇ, said cam 26 having its lobe interposed between the base circles of the said cams 7ª and 7ᵇ as clearly shown in Figure 6, whereby it will, when raised, open the relief ports 22ª and 22ᵇ.

The described arrangements afford a very simple means of effecting the positive control of air elimination and oil replenishing in hydraulic actuating means such as hydraulic valve gears, and admit of many variations of design and part arrangement in carrying out the principles involved; and the invention may, therefore, be developed within the scope of the following claims without departing from the essential features of the said invention, it being desired that the specification and drawings be read as being merely illustrative and not in a limiting sense, except as necessitated by the prior art.

I claim:

1. In combination with an inlet and an exhaust valve of an engine cylinder, an individual hydraulic fluid casing for each valve to the interior of which the stems of the valves are exposed for hydraulic operation, non-return hydraulic fluid supply means for both of said casings, a normally closed air bleed valve opening from a region of air accumulation in each of said casings, said valve being common to both of said casings, timed mechanism imposing pulsating pressure alternately on fluid in said casings for the alternate actuation of said valves, and means opening said bleed valve during periods of substantial zero pressure in both of said casings.

2. In combination with an inlet and an exhaust valve of an engine cylinder, an individual hydraulic fluid casing for each valve to the interior of which the stems of the valves are exposed for hydraulic operation, non-return hydraulic fluid supply means for both of said casings, a normally closed air bleed valve common to both of said casings and opening from regions of air accumulation therein, timed mechanism for imposing pulsating pressure alternately on fluid in said casings for the alternate actuation of said valves and for operating a bleed valve, said bleed valve being opened by a part of said timed mechanism during the period of substantial zero pressure in both of said casings.

3. In combination with an inlet and an exhaust valve of an engine cylinder, an individual hydraulic fluid casing for each valve to the interior of which the stems of the valves are exposed for hydraulic operation, non-return hydraulic fluid supply means for both of said casings, a normally closed air bleed valve opening from regions of air accumulation in both of said casings, said valve being common to both of said casings, and timed mechanism imposing actuating impulses successively on the fluid of said exhaust valve casing, on the fluid of said inlet valve casing and on said bleed valve whereby said bleed valve is opened during the period following the operation of said inlet valve and prior to the succeeding operation of said exhaust valve.

4. In combination according to claim 2, wherein the said mechanism includes plungers operating against the fluid in said casings and a series of cams operating the plunger of the exhaust valve casing, the plunger of the inlet valve casing and the outlet valve successively.

5. In a hydraulic actuator device, a hydraulic fluid casing, a fluid supply manifold, a non-return valve opening from said manifold to said casing, a plunger for imposing intermittent pressure on fluid in said casing, an outlet valve opening from a region of air accumulation in said casing, said outlet valve being spaced from said plunger and separate therefrom, and a single means for operating said plunger and said outlet valve, said means moving said plunger and said outlet valve alternately.

6. In a hydraulic actuator device, a hydraulic fluid casing, a plunger imposing intermittent pressure on fluid in said casing, an outlet valve opening from a region of air accumulation in said casing, said outlet valve being spaced from said plunger, a single means for operating said plunger and said outlet valve, a fluid supply manifold, a non-return valve opening from said manifold to said casing, and means carried by a portion of said outlet valve and moved therewith for positively opening said non-return valve.

7. In a hydraulic actuator device, a hydraulic fluid casing, a fluid supply manifold, a non-return valve opening from said manifold to said casing, a plunger for imposing intermittent pressure on fluid in said casing, an outlet valve opening from a region of air accumulation in said casing, said outlet valve being spaced from said plunger and separate therefrom, and a common cam alternately operating said plunger and said outlet valve.

8. In a hydraulic valve actuating means, the combination with a puppet valve stem, of a hydraulic fluid casing to the interior of which said stem is exposed for hydraulic operation, a normally closed air bleed valve opening from a region of air accumulation in said casing, a fluid supply manifold, a non-return valve opening from said manifold to said casing, a plunger and means for operating the same for imposing pulsating pressure on fluid in said casing for the actuation of said valve stem, said air bleed valve being spaced from said plunger, means positively opening said bleed valve intermediate periods of pressure on fluid in said casing and means operated by the movement of said bleed valve for positively opening the non-return valve.

9. In a hydraulic valve actuating means, in combination with a puppet valve stem, a hydraulic fluid casing to the interior of which said stem is exposed for hydraulic operation, a fluid supply manifold, a non-return valve opening from said manifold to said casing, a plunger for imposing pulsating pressure on fluid in said casing for the actuation of said valve stem, and a normally closed air bleed valve opening from a region of air accumulation in said casing, said bleed valve being spaced from said plunger and separate therefrom, and a common cam for alternately operating said plunger and said bleed valve.

10. In a hydraulic valve actuating means, in combination with a puppet valve stem, of a hydraulic fluid casing to the interior of which said stem is exposed for hydraulic operation, a fluid supply manifold, a non-return valve opening from said manifold to said casing, a cam-operated plunger imposing intermittent pressure on fluid in said casing for the actuation of said valve stem, a cam-operated outlet valve opening from a region of air accumulation in said casing, means carried by a portion of said valve for positively operating said non-return valve, and a common cam alternately operating said plunger and said outlet valve.

11. In combination with an inlet and exhaust valve of an engine cylinder, separate hydraulic fluid casings for each valve into which the stems of the valves project for actuation, means for periodically impressing pressure on the fluid to actuate the valves, fluid supply means for each casing, a bleed valve common to both hydraulic casings and operated by timed means between pressure actuations.

12. In an internal combustion engine having inlet and exhaust valves operated by separate fluid columns inclosed in casings which have plungers to impress actuating pressure thereon periodically, fluid supply means connected to the casings to keep them full of fluid, a bleed valve common to both casings to bleed both air and a small quantity of oil, and timed mechanism to operate said bleed valve during inoperative plunger periods.

13. In an internal combustion engine having hydraulic operating systems for intake and exhaust valves, and a source of fluid supply therefor, a bleed valve common to said operating systems to bleed therefrom air and oil to keep a solid fluid column, and timed means to actuate said bleed valve during periods of low pressure in the hydraulic systems.

14. In a hydraulic actuator device, means for bleeding air from a hydraulic fluid casing wherein fluid is subjected to pulsating pressure comprising a channel in the casing from a point of air accumulation, a plunger in the casing, an opening in the plunger that coincides with the channel in raised position, a second channel longitudinal through the plunger connected with the opening and a spring biased valve within the plunger near the lower end of the plunger channel to control the flow from the lower end of the channel, and actuating means to raise the plunger at periods of low pressure in the casing.

15. In hydraulic valve actuating means, in combination with a puppet valve stem, a hydraulic fluid casing to the interior of which said stem is exposed for operation, a fluid supply manifold, a non-return valve opening from said manifold to said casing, a cam operated plunger imposing intermittent pressure on fluid in said casing for the actuation of said valve stem, a plunger outlet valve opening from a region of air accumulation in said casing whose axis is set at an angle to the operating plunger, and a single cam operating both plungers alternately whereby when the actuating plunger is moved the bleed plunger will be in closed position and when the bleed plunger is moved to open position the actuating plunger will not be impressing pressure upon the fluid.

WARREN NOBLE.